UNITED STATES PATENT OFFICE.

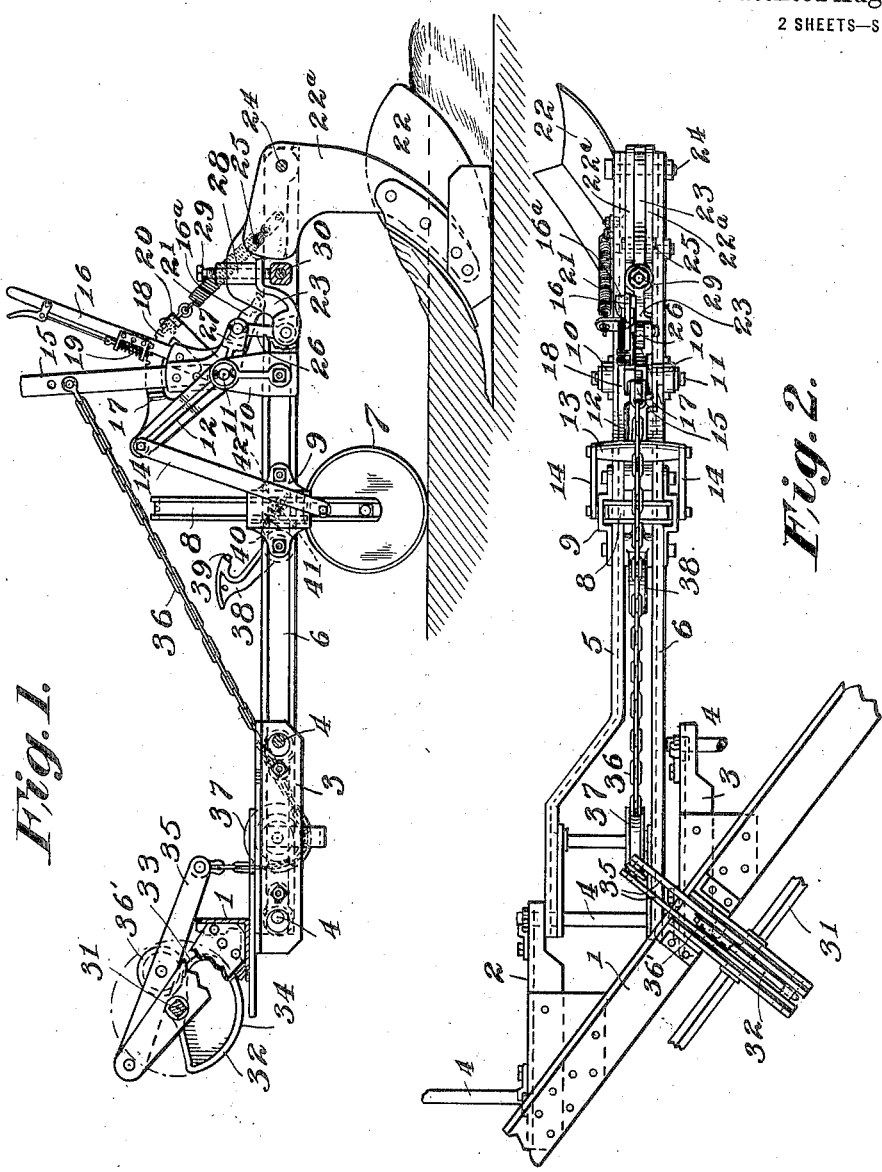

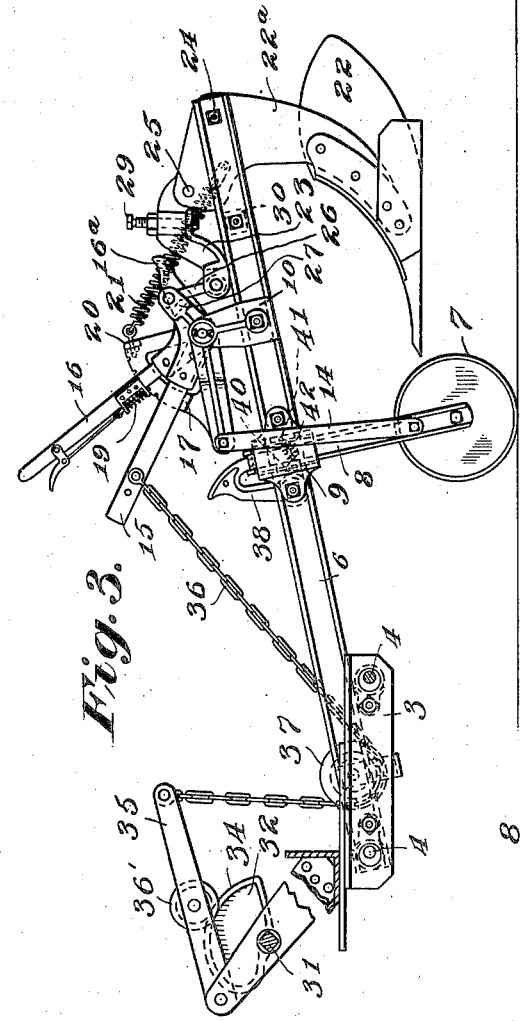

WILLIAM N. SPRINGER, OF PEORIA, ILLINOIS, ASSIGNOR TO AVERY COMPANY, OF PEORIA, ILLINOIS, A CORPORATION OF ILLINOIS.

GANG-PLOW.

1,312,281.            Specification of Letters Patent.    Patented Aug. 5, 1919.

Application filed July 2, 1912. Serial No. 707,307.

*To all whom it may concern:*

Be it known that I, WILLIAM N. SPRINGER, a citizen of the United States, residing at Peoria, in the county of Peoria and State of Illinois, have invented certain new and useful Improvements in Gang-Plows, of which the following is a specification, reference being had therein to the accompanying drawings.

This invention relates to gang plows and more particularly to gang plows of the type adapted to be drawn by a traction engine. Such plows have a main frame suitably supported from the ground and a series or gang of plows coupled to the main frame so as to be drawn by it. Preferably, the individual plows are pivoted to the main frame for movement about normally fixed horizontal transverse axes and are supported by means of ground wheels, one wheel being provided for each plow. These ground wheels serve to gage the depth of plowing and also serve as supports, or abutments, to be acted upon by suitable lever mechanisms to raise the beams. Heretofore in plows of this class it has been usual to secure the plow bodies and the plow standards in normally fixed positions with respect to the beams. As the result of this relatively rigid mounting the plow body swings about the pivotal axis of the beam connection when the beam is raised, and the point of the plow being nearer the axis is not raised as high as the rear part of the plow. Consequently, even when the plow body is in its uppermost position the point is relatively low and in a position to contact with objects lying on the ground and to collect trash of various sorts. One object of this invention is to provide an improved construction whereby each plow body is raised in substantially parallel relationship to itself, the point being raised as high above the ground as is the rear part.

In a plowing mechanism of this class it is customary to set the plow body at a working angle such that the body tends to suck into the ground, this downward force being balanced by the ground-engaging supporting wheel. This downward suck, while very desirable during plowing, is somewhat detrimental when lifting is desired, as it adds to the force which must be exerted to lift the plows from the ground. In order to reduce the downward suck at the time of lifting, I have provided means in my improved plow whereby the forward end of the plow body can be automatically tilted upward just prior to or at the time of the commencement of lifting. And after this upward tilting is effected the subsequent lifting of the body is carried on in such a way that the body remains in substantial parallel relationship to itself, as set forth above.

As above stated, plows of this class have the bodies so mounted as to provide a downward sucking force which is carried by the ground wheels. This sucking force depends upon the working angle, and this angle must be changed to vary the suck when the depth of plowing is to be varied. It is necessary for the angle of suck of the plow to be such that the plow tends to move into the ground to a depth slightly greater than that permitted by the supporting wheel. This constant tendency of the plow to move downward, which is limited by the ground wheel, causes the plow to travel at a uniform depth. It is obvious, however, that if the operator desires to change the depth by even a fraction of an inch, he must also change the angle of suck. If the depth is to be increased, the angle of suck must be increased in order to hold the plow to its full depth. Or, if the depth of plowing is to be decreased, the angle of suck must be decreased in order to prevent a too great downward pressure on the ground wheels, together with the resulting increased strain on the parts and the resulting increased draft.

Preferably, my improved construction is used in connection with power mechanism for elevating the plows and it is desirable that this power mechanism be constructed and arranged to lift the plows from the ground in succession, so that their furrows may end on the same transverse line. It will be understood, however, that the power lifting mechanism is not essential to my present invention in its broader aspects and that if desired my improved construction may be used in connection with manually operable lifting devices.

My improved construction has certain features which make it especially well adapted to be used in combination with power lifting devices such as those referred to. The beam is supported on the ground wheel in such a way that it is at all times free to be lifted upon the application of a lifting force. There are no latches, or equivalent devices, to be released in order to permit the beam to move.

In the accompanying drawings which illustrate the form of my invention which I now prefer, Figure 1 is a view partly in section of one plow embodying my invention.

Fig. 2 is a plan view of the plow with the parts adjusted as shown in Fig. 1.

Fig. 3 is a side view similar to Fig. 1 but shows the plow in lifted position.

Fig. 4 is a detailed view partly in section of the supplemental locking mechanism.

Referring to the drawings, 1, represents an obliquely arranged horizontal bar at the rear end of the main frame of a plow. This main frame may be supported on wheels in the usual way and may be connected to a tractor to be hauled thereby.

The plowing units can be connected with the main frame in any of several ways, but it is essential that the connection be such that the main frame will hold the units against turning about longitudinal horizontal axes. Preferably, each unit has a transverse horizontal pivotal connection with the frame and also, by preference, this pivotal connection is vertically fixed so that it cannot move normally from one horizontal plane to another. In the preferred construction 2 and 3 represent two of a series of equally spaced arms or brackets which are connected at their forward ends to the main frame bar 1. Each of these brackets has a bearing in its forward end for one end of a transverse pivot pin 4, the other end of the pivot pin being mounted in a similar bearing at the rear end of the next adjacent bracket.

Each of the plows has a beam consisting of two parallel bars 5 and 6. The front ends of the bars are spread apart and are pivoted on one of the aforesaid pins 4. This spreading apart of the forward ends of the bars gives a wide pivotal connection which rigidly holds the beam against lateral movement.

Connected to each plow is a gage and lifting wheel 7. This wheel 7 is mounted in suitable bearings in the lower ends of an inverted U-shaped standard 8 which is slidably secured to the beam bars by means of plates 9.

Mounted upon the beams 5 and 6 at the rear of the standard 8 are two brackets 10—10, in which is mounted a transverse pin 11.

12 is a lever forked at its lower end and having bearings on the pin 11 at points immediately adjacent the bearings 10—10. The lever 12 has a crossbar 13 at its upper end and links 14—14 connect the ends of the crossbar with the lower parts of the U-shaped standard 8.

Mounted on the pin 11 between the two forks of the lever 12 are two other levers 15 and 16. The lever 12 carries a stop 17 in position to be engaged by the lever 15 and also carries a notched segment 18 adapted to be engaged by a manually controllable latch 19 on the lever 16. A stop 20 serves to limit the rearward movement of the lever 16 with respect to the lever 12. The lever 16 is provided with a rearward extending arm $16^a$, which is arranged to engage with one of the beam bars, preferably the bar 5. A spring 21 connects the rear part of the segment 18 with one of the beam bars and tends to hold the lever 12 in its rearmost position.

22 represents the plow body which can be of any approved form and $22^a$ represents the standard to which the plow body 22 is secured. The upper end of the standard is provided with a centrally disposed slot within which is positioned the rear end of a horizontal arm 23. The standard and the arm are connected to the beam by a common pivot pin 24. The standard and the arm are connected together by means of a pin 25 which extends through both of them. This pin 25 is preferably of wood and serves as a safety device, the pin being broken in case an obstruction is met by the plow. In case of the breaking of the pin it will be apparent that the plow can freely swing backward about the pin 24 as a pivot.

The forward end of the arm 23 is connected by means of a link 26 with an arm 27 which is connected to or formed integrally with the lever 15.

At 28 the arm 23 is arched upward and is provided with an adjustable screw 29 which engages a crosspiece 30, which extends transversely between the two beam bars 5 and 6. This screw serves to limit the downward movement of the arm with respect to the beam.

Mounted upon the frame is an oblique rotatable power shaft 31, upon which there are mounted a series of cams 32, one of which is shown in the drawings. Each of these cams has an active portion 33, and a neutral portion 34. Mounted adjacent each cam is a lever 35 having a roller 36' adapted to engage the cam. Between each lever 35 and the corresponding lever 15 on the plow beam there extends a chain 36, a guide sheave 37, being preferably provided for the chain at a point near the pivotal connection of the beam to the main frame.

In operation, when it is desired to raise the plows from the ground, the power shaft 31 is caused to rotate, preferably through a half revolution. As the cam 32 is rotated it engages the roller 36' and lifts the lever 35 from the position shown in Fig. 1 to the position shown in Fig. 3. This movement of the lever 35 causes a corresponding movement of the chain 36 and of the lever 15. The lever 15 may or may not, according to the adjustment of the screw 29, be initially in contact with the stop 17. But in any event the lever 15 comes into contact with the stop 17 and as it is moved causes a corresponding movement of the lever 12, which, through the links 14, moves the ground wheel 7 downward with respect to the beam, or, stating it conversely, moves the beam upward with respect to the ground wheel. After the beam has thus been moved upward it is held in its upper position by the engagement of the roller 36 with the neutral part 34 of the cam.

As the lever 15 is swung forward by the chain in the manner described the arm 27 is swung upward and carries with it the link 26 and the forward end of the arm 23. In this way the plow body 21 is maintained substantially level, the tendency of the point to move slower because of its greater proximity to the pivot 4 being counteracted by the upward swinging of the arm 23 and the plow under the influence of the arm 27 and the link 26. In fact, when the lever 15 is not initially in engagement with the stop 17 the plow point is swung upward before there is any upward movement of the beam or of the rear end of the plow. This initial upward swinging of the plow point is of advantage as it relieves the downward sucking action of the plow and in fact tends to cause the plow to work upward of its own accord.

As has been stated, the spring 21 tends to hold the lever 12 in its rearmost position. Inasmuch as the lever 16 is normally locked to the lever 12 by means of the latch 19, the arm 16ª on the lever, because of its engagement with the beam bar 5, serves to limit this rearward movement. It will be seen that by changing the position of the hand lever 16 and causing the latch 19 to become engaged in another notch the position of the lever 12 can be adjusted. Obviously, the adjustment of the position of the lever 12 causes a corresponding adjustment of the position of the wheel 7. As the wheel 7 serves to gage the depth of plowing, this depth can be adjusted simply by changing the position of the hand lever 16 and causing the latch to be engaged with the proper notch. It will be noted that adjustment of the lever 12 does not affect the lever 15 and consequently does not affect the arm 23 which, when the chain 36 is slack, is supported at its forward end entirely by the screw 29. At this point it should be noted that by adjusting this screw 29 the arm 23 can be thrown upward or downward, the plow point moving upward or downward with the arm. The angle of suck of the plow can thus be changed in accordance with any change in the position of the gage wheel. It should also be noted that the spring 21, in addition to merely holding the lever 12 in its rearmost position, also tends to draw the lever backward and to force the plow downward after it has been swung forward and the plow lifted.

In transporting the plows for long distances it is frequently desirable to relieve the chains 36 from the strains and shocks incident to supporting the plows. For this purpose I provide on each beam a pivoted hook 38 having a projection 39 adapted, when the hook is in proper position, to enter a suitable aperture in the upper horizontal part of the standard 8. When this hook is in position it transmits the weight of the beam and the plow directly to the standard, thus relieving the chain 36. Each hook 38 is provided with an arm 40 to which is pivoted one end of a pin 41. The other end of the pin 41 is slidable through a suitable pivoted abutment between the beams. A compression spring 42 surrounds the pin 41 and tends to hold the hook either out of operative position, as shown in Fig. 1, or in operative position, as shown in Fig. 3.

It will be observed that the lever 16 is adapted not only for the adjustment of the stop 16ª, but also for moving the lever 12 to lift the beam and the body. Normally, of course, the beam and the body will be lifted as above described by means of power applied through the chain 36 and the lever 15. But it frequently happens that it is desired to lift the beam and body when the power mechanism is not available, as, for instance, when the mechanism, as a whole, is standing still. When it is desired to lift the unit under these circumstances the lever 16 can be grasped by one or more operators and swung forward, thereby swinging the lever 12 forward and pressing down on the ground wheels. After lifting the unit can be locked in lifted position by means of the hook 38. It will be observed that the lifting by means of the hand lever does not interfere in any way with the power operated parts, these, in fact, remaining in fixed positions with respect to the beam.

What I claim is:—

1. In a gang plow, the combination of a main frame, an individual plow having a beam pivotally connected at its forward end to the main frame, a plow body pivotally connected to the rear end of the beam, means for swinging the plow body about its pivotal connection forward and upward with respect to the beam, mechanism for lifting the beam about its pivotal connection with the frame, and means for automatically actuating the said beam lifting mechanism after a predetermined movement of the plow body with respect to the beam.

2. In a gang plow, the combination of a main frame, an individual plow having a beam pivotally connected at its forward end to the main frame, a plow body pivotally connected to the beam at the rear end thereof, a ground wheel upon which the beam is supported, means for swinging the plow body about its pivotal connection forward and upward with respect to the beam, mechanism connected with the ground wheel for lifting the beam and the plow body with respect thereto, and means for automatically actuating the said beam lifting mechanism after a predetermined movement of the plow body with respect to the beam.

3. The combination of a main frame mounted in fixed relation to the ground, a plow beam having a vertically fixed horizontal pivotal connection at its front end with the main frame and held thereby against turning about a longitudinal axis, a plow body connected to the rear end of the beam, means for lifting the beam and the body relatively to the frame and the ground about the axis of the said pivotal connection, and mechanism for automatically tilting the front end of the body upward with respect to the frame at the commencement of lifting and for then automatically holding the plow body in approximate parallelism with its initial tilted position during lifting and when in lifted position.

4. The combination of a main frame mounted in fixed relation to the ground, a plow beam having a vertically fixed horizontal pivotal connection at its front end with the main frame and held thereby against turning about a longitudinal axis, a plow body connected to the rear end of the beam, a ground wheel upon which the beam is supported, mechanism connected to the ground wheel for lifting the beam and the plow body with respect thereto about the axis of the said pivotal connection, and mechanism for automatically lifting the front end of the body upward with respect to the frame at the commencement of lifting and for then automatically holding the plow body in approximate parallelism with its initial tilted position during lifting and when in lifted position.

5. The combination of a main frame, an individual plow having a beam pivotally connected at its forward end to the main frame, a plow body pivotally connected to the rear end of the beam, means for swinging the plow body about its pivotal connection forward and upward with respect to the beam, mechanism for lifting the beam about its pivotal connection with the frame, means for automatically actuating the said beam lifting mechanism after a predetermined movement of the plow body with respect to the beam, and means for regulating at will the amount of the said predetermined movement of the plow body.

6. The combination of a main frame, an individual plow having a beam pivotally connected at its forward end to the main frame, a plow body pivotally connected to the rear end of the beam, means for swinging the plow body about its pivotal connection forward and upward with respect to the beam, a ground wheel upon which the beam is supported, mechanism connected to the ground wheel for lifting the beam and the plow body with respect thereto about the axis of the said pivotal connection, means for automatically actuating the said beam lifting mechanism after a predetermined movement of the plow body with respect to the beam, and means for regulating at will the amount of the said predetermined movement of the plow body.

7. The combination of a main frame mounted in fixed relation to the ground, a beam having a vertically fixed horizontal pivotal connection at its forward end with the main frame whereby it is held against turning about a longitudinal axis, a plow body pivotally connected to the beam at the rear end thereof, a ground wheel upon which the beam is supported, mechanism connected to the ground wheel for lifting the beam and the plow body with respect thereto about the axis of the said pivotal connection, means connected with the lifting mechanism for automatically swinging the plow body about its pivotal axis forward and upward with respect to the beam as the beam is lifted and rearward and downward as the beam is lowered, and an adjustable stop interposed between said body-swinging means and the beam for limiting the rearward and downward swinging of the body to determine the working angle thereof.

8. The combination of a main frame mounted in fixed relation to the ground, a beam having a vertically fixed horizontal pivotal connection at its forward end with the main frame whereby it is held against turning about a longitudinal axis, a plow body pivotally connected to the beam at the rear end thereof, a ground wheel upon which the beam is supported, mechanism connected to the ground wheel for raising and lowering the beam and the plow body with respect thereto about the axis of the said pivotal connection, means connected with the said mechanism for automatically swinging the plow body about its pivotal axis forward and upward with respect to the beam as the beam is raised and rearward and downward as the beam is lowered, and an adjustable stop interposed between said beam and said beam-raising-and-lowering means for limiting the downward movement of the beam and body to determine the depth of plowing.

9. The combination of a main frame mounted in fixed relation to the ground, a beam having a vertically fixed horizontal pivotal connection at its forward end with the main frame whereby it is held against turning about a longitudinal axis, a plow body pivotally connected to the beam at the rear end thereof, a ground wheel upon which the beam is supported, mechanism connected to the ground wheel for raising and lowering the beam and the plow body with respect thereto about the axis of the said pivotal connection, means connected with the lifting mechanism for automatically swinging the plow body about its pivotal axis forward and upward with respect to the beam as the beam is raised and rearward and downward as the beam is lowered, an adjustable stop interposed between said body swinging means and the beam for limiting the rearward and downward swinging of the body to determine the working angle thereof, and an adjustable stop interposed between the beam-lifting means and the beam for limiting the downward movement of the beam and body to determine the depth of plowing.

10. The combination of a main frame mounted in fixed relation to the ground, a beam having a vertically fixed horizontal pivotal connection at its front end with the main frame, a plow body pivotally connected to the beam at the rear end thereof, a ground wheel with respect to which the beam is vertically movable, a lever pivoted on the beam, means for moving the lever, a connection between the lever and the ground wheel whereby the beam is swung upward with respect to the ground wheel about the axis of the said pivotal connection when the lever is moved, a connection between the lever and the plow body whereby the plow body is automatically swung forward and upward with respect to the beam when the lever is moved to swing the beam upward, and an adjustable stop interposed between the lever and the beam for limiting the action of the connection between the lever and the wheel thereby determining the depth of plowing.

11. The combination of a main frame mounted in fixed relation to the ground, a beam having a vertically fixed horizontal pivotal connection at its front end with the main frame, a plow body pivotally connected to the beam at the rear end thereof, a ground wheel with respect to which the beam is vertically movable, a lever pivoted on the beam, means for moving the lever, a connection between the lever and the ground wheel whereby the beam is swung upward with respect to the ground wheel about the axis of the said pivotal connection when the lever is moved, a connection between the lever and the plow body whereby the plow body is automatically swung forward and upward with respect to the beam when the lever is moved to swing the beam upward, and an adjustable stop interposed between the beam lifting means and the beam for limiting the action of the connection between the lever and the plow body thereby determining the working angles of the body.

12. The combination of a main frame mounted in fixed relation to the ground, a beam having a vertically fixed horizontal pivotal connection at its front end with the main frame, a plow body pivotally connected to the beam at the rear end thereof, a ground wheel with respect to which the beam is vertically movable, a lever pivoted on the beam, means for moving the lever, a connection between the lever and the ground wheel whereby the beam is swung upward with respect to the ground wheel about the axis of the said pivotal connection when the lever is moved, a connection between the lever and the plow body whereby the plow body is automatically swung forward and upward with respect to the beam when the lever is moved to swing the beam upward, an adjustable stop interposed between the lever and the beam for limiting the action of the connection between the lever and the wheel, thereby determining the depth of plowing, and an adjustable stop interposed between the lever and the beam for limiting the action of the connection between the lever and the plow body thereby determining the working angles of the body.

13. The combination of a main frame mounted in fixed relation to the ground, a beam having a vertically fixed horizontal pivotal connection at its front end with the main frame, a plow body pivotally connected to the beam at the rear end thereof, a ground wheel with respect to which the beam is vertically movable, a lever pivoted on the beam, means for moving the lever, a connection between the lever and the ground wheel whereby the beam is swung upward with respect to the ground wheel about the axis of the said pivotal connection when the lever is moved, a connection between the lever and the plow body whereby the plow body is automatically swung forward and upward with respect to the beam when the lever is moved to swing the beam upward, and adjustable means interposed between the lever and the beam for causing the connection between the lever and the wheel to be inoperative during part of the movement of the lever.

14. The combination of a main frame mounted in fixed relation to the ground, a beam having a vertically fixed horizontal pivotal connection at its forward end with the main frame, a plow body pivotally connected to the beam at the rear end thereof, a ground wheel with respect to which the beam is vertically movable, a lever pivoted to the beam, a connection between the lever and the ground wheel whereby the beam is swung upward when the lever is moved in one direction, a second lever pivoted on the beam, a connection between the second lever and the plow body whereby the plow body is swung forward and upward with respect to the beam when the second lever is moved, means for moving the said second lever, a stop interposed between the levers whereby the second lever may engage the first lever to move it and elevate the beam when the second lever is moved to swing the plow body forward and upward, and an adjustable means supplemental to the second lever and the said stop and interposed between the first lever and the beam for normally determining the position of the first lever.

15. The combination of a main frame mounted in fixed relation to the ground, a beam having a vertically fixed horizontal pivotal connection at its forward end with the main frame, a plow body pivotally connected to the beam at the rear end thereof, a ground wheel with respect to which the beam is vertically movable, a lever pivoted to the beam, a connection between the lever and the ground wheel whereby the beam is swung upward when the lever is moved in one direction, a second lever pivoted on the beam co-axially with the first lever, a connection between the second lever and the plow body whereby the plow body is swung forward and upward with respect to the beam when the second lever is moved, means for moving the said second lever, a stop interposed between the first lever and the second lever whereby the second lever may engage the first lever to move it and elevate the beam when the second lever is moved to swing the plow body forward and upward, a third lever pivoted on the beam co-axially with the first and second levers, means for locking the third lever to the first in any one of several positions, and a stop carried by the third lever and adapted to be limited in its movement by the beam for normally determining the position of the said third lever together with that of the first.

16. In a gang plow, the combination of a main frame, an individual plow having a beam pivotally connected at its forward end to the main frame, a plow body pivotally connected to the beam at the rear end thereof, a ground wheel upon which the beam is supported, a lever pivoted on the beam, a connection between the lever and the ground wheel whereby the beam and the plow body are raised when the lever is moved in one direction, a connection between the lever and the plow body whereby the plow body is swung forward and upward or backward and downward with respect to the beam as the lever is moved, means for moving the lever in the direction to raise the beam and the plow body and to swing the plow body forward and upward, and a spring connected for moving the lever in the other direction and for moving the beam downward with respect to the ground wheel.

17. In a gang plow, the combination of a main frame, an individual plow having a beam pivotally connected at its forward end to the main frame, a plow body pivotally connected to the beam at the rear end thereof, a ground wheel upon which the beam is supported, a lever pivoted on the beam, a connection between the lever and the ground wheel whereby the beam and the plow body are raised when the lever is moved in one direction, a connection between the lever and the plow body whereby the plow body is swung forward and upward or backward and downward with respect to the beam as the lever is moved, means for moving the lever in the direction to raise the beam and the plow body and to swing the plow body forward and upward, a spring connected for moving the lever in the other direction and for moving the beam downward with respect to the ground wheel, and an adjustable stop for limiting the movement of the beam downward with respect to the ground wheel whereby the depth of plowing is determined.

18. In a gang plow, the combination of a main frame, an individual plow having a beam pivotally connected at its forward end to the main frame, a plow body pivotally connected to the beam at the rear end thereof, a ground wheel upon which the beam is supported, a lever pivoted on the beam, a connection between the lever and the ground wheel whereby the beam and the plow body are raised when the lever is moved in one direction, a connection between the lever and the plow body whereby the plow body is swung forward and upward or backward and downward with respect to the beam as the lever is moved, means for moving the lever in the direction to raise the beam and the plow body and to swing the plow body forward and upward, a spring connected for moving the lever in the other direction and for moving the beam downward with respect to the ground wheel, and an adjustable stop for limiting the movement of the plow body backward and downward with respect to the beam whereby the dip of the plow is determined.

19. In a gang plow, the combination of a main frame, an individual plow having a beam pivotally connected at its forward end to the main frame, a plow body pivotally connected to the beam at the rear end thereof, a ground wheel upon which the beam is supported, a lever pivoted on the beam, a connection between the lever and the ground wheel whereby the beam and the plow body are raised when the lever is moved in one direction, a connection between the lever and the plow body whereby the plow body is swung forward and upward or backward and downward with respect to the beam as the lever is moved, means for moving the lever in the direction to raise the beam and the plow body and to swing the plow body forward and upward, a spring connected for moving the lever in the other direction and for moving the beam downward with respect to the ground wheel, an adjustable stop for limiting the movement of the beam downward with respect to the ground wheel whereby the depth of plowing is determined, and an adjustable stop for limiting the movement of the plow body backward and downward with respect to the beam whereby the dip of the plow is determined.

20. In a gang plow, the combination of a main frame, an individual plow having a beam pivotally connected at its forward end to the main frame, a plow body pivotally connected to the beam at the rear end thereof, a ground wheel with respect to which the beam is vertically movable, a transverse pivot pin on the beam, a lever pivoted on the pin, links for connecting the lever to the ground wheel whereby the beam may be swung upward when the lever is moved in one direction, a second lever on the pin, means for connecting the first lever to the second lever in any one of a plurality of positions, a stop connected with the second lever for limiting the movement of the two levers in the other direction, a third lever pivoted on the pin, a connection between the third lever and the plow body whereby the plow body is swung with respect to the beam when the lever is moved, means for swinging the third lever in the direction to swing the plow body forward and upward with respect to the beam, and a stop whereby the third lever may engage the first lever to move it in the direction to raise the beam and plow body with respect to the ground wheel.

21. The combination of a main frame mounted in fixed relation to the ground, a beam having a vertically fixed horizontal pivotal connection at its forward end with the main frame, a plow body connected with the beam, a ground wheel with respect to which the beam is vertically movable, a carrier connected at its lower end with the ground wheel and having slidable engagement with the beam, means for moving the beam upward with respect to the ground wheel and the carrier, and a hook pivoted on the beam at a point adjacent the carrier and adapted to be swung independently of the beam moving means into engagement with the carrier when the beam is raised to hold the beam in raised position.

22. The combination of a main frame mounted in fixed relation to the ground, a beam having a vertically fixed horizontal pivotal connection at its forward end with the main frame, a plow body connected with the beam, a ground wheel with respect to which the beam is vertically movable, a carrier connected at its lower end with the ground wheel and having slidable engagement with the beam, means for moving the beam upward with respect to the ground wheel and the carrier, a hook pivoted on the beam at a point adjacent the carrier and adapted to be swung independently of the beam moving means into engagement with the carrier when the beam is raised to hold the beam in raised position, and spring mechanism for holding the hook at either of two extreme positions.

23. In a gang plow, the combination of a main frame, an individual plow having a beam pivotally connected at its forward end to the main frame, a plow body connected with the beam, a ground wheel with respect to which the beam is vertically movable, a carrier connected at its lower end with the ground wheel and having slidable engagement with the beam, means for moving the beam upward with respect to the ground wheel and the carrier, a hook pivoted on the beam at a point adjacent the carrier, the hook being adapted to be swung into engagement with the carrier when the beam is raised to hold the beam in raised position, a spring connected at one end with the beam, and an arm connected to the hook and arranged to lie at one side of the line connecting the point at which the hook is connected to the beam and the point at which the spring is connected to the beam when the hook is out of operative position, and to lie at the other side of the said line when the hook is in operative position, the spring being connected to the arm thus serving to hold the hook in whichever position it may be placed.

24. The combination of a main frame, a relatively vertically movable plow beam connected at its front end to the main frame and held thereby against turning about a longitudinal axis, a plow body connected to the rear end of the beam, a ground wheel upon which the beam is supported, mechanism connected to the ground wheel for lifting the beam and the plow body with respect thereto, a normally inactive power means for actuating the lifting mechanism having permanent connection at one point with the said mechanism and at another point with parts fixed against bodily movement therewith, and means connected with the lifting mechanism for automatically moving the body to hold it in substantial parallelism with its working position during lifting and when in lifted position.

25. The combination of a main frame, a relatively vertically movable plow beam connected at its front end to the main frame and held thereby against turning about a longitudinal axis, a plow body connected to the rear end of the beam, a ground wheel upon which the beam is supported, mechanism connected to the ground wheel for lifting the beam and the plow body with respect thereto, a normally inactive power means for actuating the lifting mechanism having permanent connection at one point with the said mechanism and at another point with parts fixed against bodily movement therewith, and mechanism for automatically tilting the front end of the body upward with respect to the frame at the commencement of lifting and for then automatically holding the plow body in substantial parallelism with its initial tilted position during lifting and when in lifted position.

26. The combination of a main frame mounted in fixed relation to the ground, a plow beam having a vertically fixed horizontal pivotal connection at its front end with the main frame and held thereby against turning about a longitudinal axis, a plow body connected to the rear end of the beam, a ground wheel upon which the beam is supported, mechanism connected to the ground wheel for lifting the beam and the plow body with respect thereto about the axis of the said pivotal connection, a normally inactive power means for actuating the lifting mechanism having permanent connection at one point with the said mechanism and at another point with parts fixed against bodily movement therewith, and mechanism for automatically lifting the front end of the body upward with respect to the frame at the commencement of lifting and for then automatically holding the plow body in substantial parallelism with its initial tilted position during lifting and when in lifted position.

27. The combination of a main frame, an individual plow having a beam pivotally connected at its forward end to the main frame, a plow body pivotally connected to the rear end of the beam, means for swinging the plow body about its pivotal connection forward and upward with respect to the beam, a ground wheel upon which the beam is supported, mechanism connected to the ground wheel for lifting the beam and the plow body with respect thereto about the axis of the said pivotal connection, a normally inactive power means for actuating the lifting mechanism having permanent connection at one point with the said mechanism and at another point with parts fixed against bodily movement therewith, means for automatically actuating the said beam lifting mechanism after a predetermined movement of the plow body with respect to the beam, and means for regulating at will the said predetermined movement of the plow body.

28. The combination of a main frame mounted in fixed relation to the ground, a beam having a vertically fixed horizontal pivotal connection at its forward end with the main frame whereby it is held against turning about a longitudinal axis, a plow body pivotally connected to the beam at the rear end thereof, a ground wheel upon which the beam is supported, mechanism connected to the ground wheel for lifting the beam and the plow body with respect thereto about the axis of the said pivotal connection, a normally inactive power means for actuating the lifting mechanism having permanent connection at one point with the said mechanism and at another point with parts fixed against bodily movement therewith, means connected with the lifting mechanism for automatically swinging the plow body about its pivotal axis forward and upward with respect to the beam as the beam is lifted and rearward and downward as the beam is lowered, and an adjustable stop for limiting the rearward and downward swinging of the body to determine the working angle thereof.

29. The combination of a main frame mounted in fixed relation to the ground, a beam having a vertically fixed horizontal pivotal connection at its forward end with the main frame whereby it is held against turning about a longitudinal axis, a plow body pivotally connected to the beam at the rear end thereof, a ground wheel upon which the beam is supported, mechanism connected to the ground wheel for raising and lowering the beam and the plow body with respect thereto about the axis of the said pivotal connection, a normally inactive power means for actuating the lifting mechanism having permanent connection at one point with the said mechanism and at another point with parts fixed against bodily movement therewith, means connected with the said mechanism for automatically swinging the plow body about its pivotal axis forward and upward with respect to the beam as the beam is raised and rearward and downward as the beam is lowered, and an adjustable stop interposed between the lifting mechanism and the beam for limiting the downward movement of the beam and body to determine the depth of plowing.

30. The combination of a main frame mounted in fixed relation to the ground, a beam having a vertically fixed horizontal pivotal connection at its forward end with the main frame whereby it is held against turning about a longitudinal axis, a plow body pivotally connected to the beam at the rear end thereof, a ground wheel upon which the beam is supported, mechanism connected to the ground wheel for raising and lowering the beam and the plow body with respect thereto about the axis of the said pivotal connection, a normally inactive power means for actuating the lifting mechanism having permanent connection at one point with the said mechanism and at another point with parts fixed against bodily movement therewith, means connected with the lifting mechanism for automatically swinging the plow body about its pivotal axis forward and upward with respect to the beam as the beam is raised and rearward and downward as the beam is lowered, an adjustable stop interposed between the body-swinging means and the beam for limiting the rearward and downward swinging of the body to determine the working angle thereof, and an adjustable stop interposed between the lifting mechanism and the beam for limiting the downward movement of the beam and body to determine the depth of plowing.

31. The combination of a main frame mounted in fixed relation to the ground, a beam having a vertically fixed horizontal pivotal connection at its forward end with the main frame, a plow body connected to the rear end of the beam, a ground wheel upon which the beam is supported, a lever pivoted on the beam and connected to the ground wheel for lifting the beam and the body with respect thereto about the axis of the said pivotal connection, a normally inactive power means for actuating the said lever having permanent connection at one point with the said lever and at another point with parts fixed against bodily movement therewith, and a second lever pivoted on the beam and movable while the first lever remains stationary for lifting the beam and the body with respect to the ground wheel.

32. The combination of a main frame mounted in fixed relation to the ground, a beam having a vertically fixed horizontal pivotal connection at its forward end with the main frame, a plow body connected to the rear end of the beam, a ground wheel upon which the beam is supported, a lever pivoted on the beam and connected to the ground wheel for lifting the beam and the body with respect thereto about the axis of the said pivotal connection, a normally inactive power means for actuating the said lever having permanent connection at one point with the said lever and at another point with parts fixed against bodily movement therewith, a second lever pivoted on the beam and movable while the first lever remains stationary for lifting the beam and the body with respect to the ground wheel, and a lock mounted on the beam and operable independently of the first lever and of the power means for holding the beam and body in lifted position.

33. The combination of a main frame mounted in fixed relation to the ground, a beam having a vertically fixed horizontal pivotal connection at its forward end with the main frame, a plow body connected to the rear end of the beam, a ground wheel upon which the beam is supported, a lever pivoted on the beam and connected to the ground wheel for lifting the beam and the body with respect thereto about the axis of the said pivotal connection, a normally inactive power means for actuating the said lever having permanent connection at one point with the said lever and at another point with parts fixed against bodily movement therewith, and a second lever pivoted on the beam co-axially with the first and movable independently of the first for lifting the beam and the body with respect to the ground wheel.

34. The combination of a main frame mounted in fixed relation to the ground, a beam having a vertically fixed horizontal pivotal connection at its forward end with the main frame, a plow body connected to the rear end of the beam, a ground wheel upon which the beam is supported, a manually operable lever pivoted on the beam and connected to the ground wheel for lifting the beam and the body with respect thereto about the axis of the said pivotal connection, another lever pivoted on the beam co-axially with the manually adjustable lever and movable independently thereof, a normally inactive power means for actuating the last said lever having permanent connection at one point with the said lever and at another point with parts fixed against bodily movement therewith, and a stop carried by the manually operable lever in the path of the said power-actuated lever whereby the latter may engage the said manually operable lever to lift the beam and the body with respect to the ground wheel.

In testimony whereof I affix my signature in presence of two witnesses.

WILLIAM N. SPRINGER.

Witnesses:
L. P. TURNER,
F. A. CAMPER.